United States Patent
Bergquist et al.

(10) Patent No.: US 8,280,949 B2
(45) Date of Patent: Oct. 2, 2012

(54) SYSTEM AND METHOD FOR SYNCHRONIZED MEDIA DISTRIBUTION

(75) Inventors: Donald Joseph Bergquist, Lakewood, CO (US); Michael A. Davenport, Lakewood, CO (US); Jon A. Maucher, Monument, CO (US); Michael Wayne Church, Severn Bridge (CA)

(73) Assignee: Harris Corporation, Melbourne, FL (US)

( * ) Notice: Subject to any disclaimer, the term of this patent is extended or adjusted under 35 U.S.C. 154(b) by 74 days.

(21) Appl. No.: 12/623,032

(22) Filed: Nov. 20, 2009

(65) Prior Publication Data

US 2010/0070575 A1 Mar. 18, 2010

Related U.S. Application Data

(63) Continuation-in-part of application No. 12/519,318, filed as application No. PCT/CA2007/002255 on Dec. 13, 2007.

(60) Provisional application No. 61/187,155, filed on Jun. 15, 2009.

(30) Foreign Application Priority Data

Dec. 15, 2006 (CA) ........................................ 571617

(51) Int. Cl.
*G06F 15/16* (2006.01)
(52) U.S. Cl. ........ 709/203; 709/231; 709/232; 709/217; 709/248; 725/87; 725/110; 725/109; 725/145
(58) Field of Classification Search .................. 709/231, 709/232, 217, 203, 248; 725/87, 110, 109, 725/513, 145
See application file for complete search history.

(56) References Cited

U.S. PATENT DOCUMENTS

| | | |
|---|---|---|
| 6,173,317 B1 | 1/2001 | Chaddha et al. |
| 6,493,872 B1 | 12/2002 | Rangan et al. |
| 6,728,753 B1 | 4/2004 | Parasnis et al. |
| 6,760,043 B2 | 7/2004 | Markel |
| 6,791,579 B2 | 9/2004 | Markel |
| 6,802,019 B1 | 10/2004 | Lauder |
| 6,988,216 B2 | 1/2006 | Lauder |
| 7,020,710 B2 * | 3/2006 | Weber et al. .................. 709/232 |

(Continued)

FOREIGN PATENT DOCUMENTS

WO WO 97/41504 11/1997

OTHER PUBLICATIONS

Herng-Yow Chen, et al., "Design of a Web-based Synchronized Multimedia Lecture System for Distance Education", IEEE, © 1999, pp. 887-891.

(Continued)

*Primary Examiner* — Wing Chan
*Assistant Examiner* — Hitesh Patel
(74) *Attorney, Agent, or Firm* — Tarolli, Sundheim, Covell & Tummino LLP

(57) ABSTRACT

Systems and methods are disclosed for synchronizing distribution of media with a scheduled media event. According to one aspect of the invention, a producer transfers selected content at a server in synchronization with a scheduled media event. Consumer sessions poll the server via a network and retrieve the selected content from the server for presentation thereby, whereby the information being presented at the consumers provides a user experience that is also in synchronization with the media event.

24 Claims, 11 Drawing Sheets

U.S. PATENT DOCUMENTS

| | | | |
|---|---|---|---|
| 7,143,353 | B2 | 11/2006 | McGee et al. |
| 7,293,189 | B2 | 11/2007 | Kim et al. |
| 7,409,437 | B2 | 8/2008 | Ullman et al. |
| 7,409,700 | B1 | 8/2008 | Watson |
| 7,448,063 | B2 | 11/2008 | Freeman et al. |
| 7,457,582 | B2 * | 11/2008 | Kamada et al. .............. 455/3.01 |
| 7,506,262 | B2 | 3/2009 | Gupta et al. |
| 2001/0014210 | A1 | 8/2001 | Kang |
| 2002/0073221 | A1 | 6/2002 | Krolovetzky |
| 2002/0188959 | A1 | 12/2002 | Piotrowski |
| 2003/0033606 | A1 * | 2/2003 | Puente et al. ................. 725/110 |
| 2003/0189668 | A1 * | 10/2003 | Newnam et al. ............. 348/468 |
| 2003/0193518 | A1 | 10/2003 | Newnam et al. |
| 2004/0039834 | A1 | 2/2004 | Saunders et al. |
| 2004/0226047 | A1 | 11/2004 | Lin et al. |
| 2005/0148296 | A1 * | 7/2005 | Kopra et al. ................. 455/3.01 |
| 2006/0041921 | A1 | 2/2006 | Hane |
| 2006/0168624 | A1 * | 7/2006 | Carney et al. ................... 725/51 |
| 2006/0218248 | A1 * | 9/2006 | Shiina ........................... 709/219 |
| 2007/0124769 | A1 * | 5/2007 | Casey et al. ..................... 725/46 |
| 2007/0143493 | A1 * | 6/2007 | Mullig et al. ................. 709/232 |

OTHER PUBLICATIONS

International Search Report, 4 pgs., Feb. 24, 2011, Harris Corporation.

PCT Written Opinion—7 pgs., Feb. 24, 2011, Harris Corporation.

* cited by examiner

SYSTEM AND METHOD FOR SYNCHRONIZED MEDIA DISTRIBUTION

CROSS-REFERENCE TO RELATED APPLICATIONS

This application is a continuation-in-part of U.S. application Ser. No. 12/519,318, filed on Nov. 18, 2009, which is a 371 of International Application No. PCT/CA2007/002255, filed on Dec. 13, 2007, which claims priority to Canadian Patent Application No. 571617, which was filed on Dec. 15, 2006. This application also claims the benefit of U.S. Provisional Patent Application No. 61/187,155, which was filed on Jun. 15, 2009. The entire contents of each of the above-identified applications are incorporated herein by reference.

TECHNICAL FIELD

This invention relates generally to systems and methods for synchronizing distribution of media.

BACKGROUND

Technology advancements enable delivery of information and media to various types of devices via the internet. For example, the internet is widely available via portable devices, such as cell phones, personal digital assistants (PDAs) and notebook computers, as well as via other internet-ready appliances and personal computers. One reason for providing widely available internet access and other enhanced forms of media delivery is user convenience. Another driving force behind the increasing efforts in providing enhanced media delivery is revenue received by media providers for advertising. Advertising revenue through traditional methods of media delivery (e.g., television, radio and print) has been declining while internet revenue is increasing as advertisers strive for enhanced advertising performance and increased accountability. Growing numbers of consumers access media directly on the internet and also enjoy watching television or listening to radio while simultaneously using the internet. Thus, the complementary nature of the internet with television and other forms of media may provide additional advertising opportunities for media providers.

SUMMARY

The invention relates generally to systems and methods for synchronizing distribution of media relative to a media event.

According to one aspect of the invention, a producer transfers selected content to a server in synchronization with a scheduled media event. Consumer sessions can poll the server via a network to retrieve the selected content from the server for presentation thereby, such that the presentation at each consumer session is also in synchronization with the scheduled media event.

Another aspect of the invention provides a method for synchronizing distribution of media with a scheduled media event. The method includes transferring selected content from a producer to a server at a time during the scheduled media event. The selected content from the producer module is stored at the server. The stored content can be provided from the server to one or more consumer via a network in synchronization with the media event.

Yet another aspect of the invention can provide a computer system programmed to transfer target files to a server in synchronization with an occurrence of a media event. Each of the target files can include at least one of preselected content or a preselected location identifier for content. The server stores the target files and makes the stored target files available for retrieval via web sessions running at each of a respective plurality of consumer devices. As a result, information presented via the web sessions at each of the plurality of consumer devices can be provided in substantial synchronization with the occurrence of the media event.

DETAILED DESCRIPTION

Figure 1:
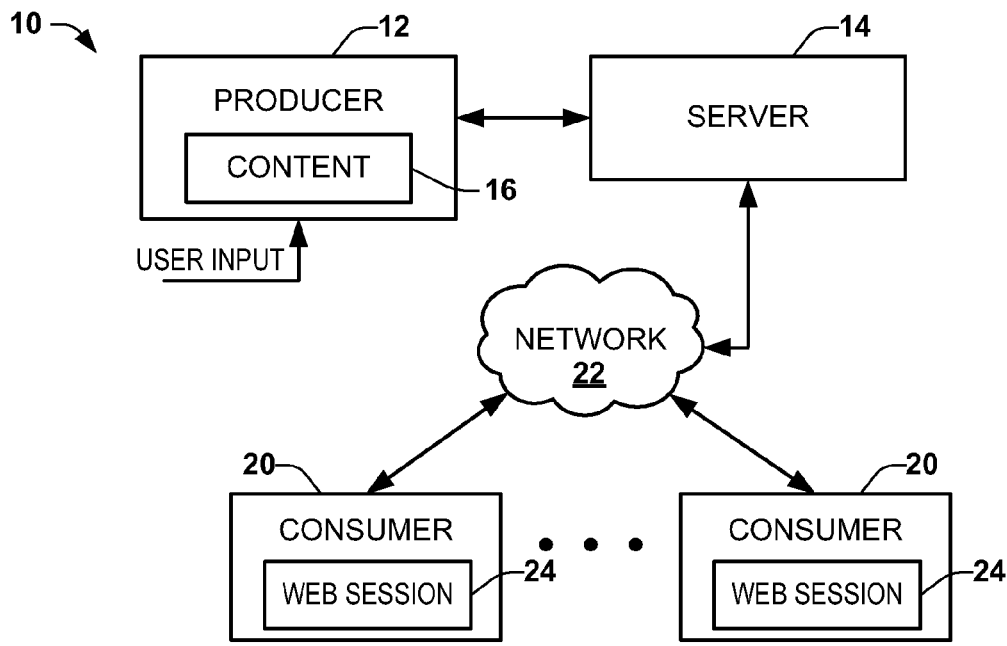
FIG. 1 depicts an example embodiment of a system for synchronizing presentation of information with a media event.

The invention relates generally to systems and methods for synchronizing distribution of media with a scheduled media event. As used herein the phrase "scheduled media event" is intended to encompass any type of media event having an intended start time that is scheduled in advance. While the scheduled start time is generally known, however, deviations in such start time can occur, such as due to circumstances can vary depending on the type of media and the type and circumstances for the event. For instance, the start time for a traditional broadcast television program can be shifted for a variety of reasons (e.g., due to presidential address). Similarly, the start time of a sporting event or concert may be shifted due to weather or failure of event participants to timely arrive. Thus, while the event may have a scheduled start time, such start time for the event is not required to occur at the originally designated start time. Additionally, the media event itself can correspond to traditional broadcast media event (e.g., broadcast via radio, television, satellite or cable) or to a live media event (e.g., a lecture, a conference, a sporting event or the like) or the media event may involve a combination two or more different types of media. The scheduled media event can be considered a primary media channel, while the content being synchronized to the media event can be considered an auxiliary or secondary media channel.

Systems and methods implemented in accordance with the invention can utilize a network, such as the internet, to provide enhanced consumer experiences in conjunction with various types of media events, such as may include live events (e.g., concerts, sporting events, seminars) and traditional media delivery (e.g., radio, television, cable). As one example, a media provider can employ a producer to transfer selected content to a server throughout the duration of a given scheduled media event. The transfer of selected content can be programmed to occur automatically at offset times from a start time and/or the transfer can be performed manually during the event. Thus, during the event different content that is selectively transferred from the producer to the server is accessible by consumers having access to the server.

As used, herein, the term "consumer" can identify a person or user, the software that a user utilizes to access a server and obtain content, the hardware device(s) on which software is implemented or to any combination thereof. For instance, a consumer network session can be activated in response to accessing a uniform resource locator (URL), such as corresponding to a web page (e.g., a web form provided in the ASP.NET framework) at the server. The consumer session can include one or more target portions that are programmed to present corresponding content that is retrieved from the server. The consumer session can further include controls programmed to periodically access the server and, in response to detecting changes in selected content (as provided by the producer), retrieve updates in selected content, such that one or more targeted presentation in the consumer session can be synchronized with the media event.

As a further example, a given media provider might configure the system to synchronize media content for scheduled programs a first broadcast channel as well as synchronize other media content for a different channel that is under the control of the media provider. The media content for each channel can be the different to provide enhanced consumer experiences unique to each channel. However, it is possible to have the same content synchronized for different media channels.

The selected content that is presented in each consumer session can include various types of information that enhance the consumer experience for the scheduled media event. By way of further example, the systems and methods can equip media providers to use the internet to better engage consumers by providing an enhanced consumer experience, such as with relevant content for their favorite programs, social networking with other program fans, and additional interactive features. Additionally, media providers can employ the internet to deliver relevant, targeted advertising to consumers over the duration of the media event rather than just during the traditional commercial break times, thereby increasing advertising opportunities and, in turn, revenue.

FIG. 1 depicts an example of a system 10 that can be employed to provide selected content that is synchronized with the occurrence of a media event. The system 10 includes a producer 12 that is in communication with a server 14. The producer 12 can include one or more applications programmed to select content 16 and transfer the selected content to the server in synchronization with one or more scheduled media event. As used, herein, the term "producer" can correspond to the software that is programmed to transfer the content to the server, to the hardware on which the software is implemented or to a combination of the software and hardware that transfer the content to the server. For example, in a system in which the producer 12 communicates with the server 14 via a network, the producer can transfer the selected content to the server via a transport protocol, such as FTP over TCP/IP as well as other protocols. The producer 12 can transfer selected content to the server 14 that is relevant to what is occurring over the duration of the media event. It will be understood that the producer 12 and the server 14 can be programmed and configured to provide multiple streams of synchronized content for any number and type of media events. For instance, multiple streams can be provided in synchronization with the same media event, such as to provide consumer experiences that can vary depending on the types of consumer devices or the level of consumer subscription.

For example, a given scheduled media event can include a broadcast program, such as may be provided via radio, television, cable and/or satellite or other broadcast technologies. When the content and timing of the scheduled media event is known by the media provider in advance of the event being broadcast or otherwise played out, the producer 12 can be programmed to transfer the selected content to the server 14 according to a predefined program that has been prearranged for the scheduled event. For instance, the predefined program can include plural units of the selected content that have been prearranged in a desired order. To control when each of the selected units of content in the predefined program is to be transferred to the server, an offset time can be set relative to a start time. The start time for initiating the predefined program can be set to begin at the scheduled start time for the scheduled event. Alternatively, the start of the scheduled event can be detected and utilized to trigger the producer to activate the predefined program. Each unit of content in the predefined program may be transferred to the server once during the event or, alternatively, it may be sent in a loop mode, such that each unit of content is repeatedly sent in order at specified time offsets until completion of the scheduled media event.

A given media event can also be a live event (e.g., a conference, a concert, a sporting event, a newscast) that is attended in person or remotely by an audience or group of participants. The attendees, audience and/or participants of a live event can be consumers 20 in the system 10. For such a live event, it will be assumed that the media provider has general knowledge of the information that will be provided during event, although the timing of such information and/or some details thereof may be unknown. For such an event, a set of relevant content 16 can be prearranged and available at the producer 12 for manual selection and transfer to the server 14 during the event (e.g., via a producer user interface). The producer 12 thus can easily select and transfer relevant content to the server 14 in synchronization with related information being provided during the event. The selected content to be transferred to the server 14 during the live event can be retrieved by the consumers attending or participating in the event.

The server 14 can store the selected content in a predefined location, such as in a folder that is addressable by the producer for transferring content in synchronization with the occurrence of the associated media event. Any number of one or more consumers 20 can be in communication with the server 14 via a network 22 (e.g., a LAN or WAN or a combination of different networks). The network 22 can include physical connections, wireless connections or a combination of physical and wireless connections. For instance, the server 14 can be implemented as a web server that is programmed to receive and respond to requests from each consumer 20. Thus, the server 14 can multicast the same media content (transferred from the producer 12) to the web session 24 at each of the consumers 20. The consumer 20 can be implemented as any network-enabled device, such as a personal computer, a notebook computer, a PDA, an Internet ready appliance, a cellular telephone that includes a browser or other application that can access resources on the server 14 via the network 22.

Each consumer 20 can access the server 14 via a predefined resource identifier, such as a URL that specifies where a resource is available for accessing information by the consumer 20. The consumers 20 can receive the resource identifier via an email or the consumer can access the resource identifier via another web page, such as from a web site associated with the media event or the provider of the event. As an example, the identified resource can be an active server page (.ASP) or an .ASPX page that is implemented at the server according to the .NET framework available from Microsoft Corporation of Redmond, Wash.

The consumer 20 can retrieve and present information resources indicated by the resource identifier (e.g., URL) in the form of text and graphics. The information resources can be presented at the consumer as part of a web session 24 initiated at the consumer 20 in response to accessing the predetermined resource identifier that has been established for the synchronized media. For instance, the web session 24 can be implemented in a web browser that has been installed on the consumer 20. Thus, no special hardware of software is required to present the selected content at the consumers 20. Additionally, the web session 24 can provide a consumer experience that includes various types and formats of static information and graphics to provide a customized look and feel for a given media provider and/or customized for the media event to which the selected content is being synchronized.

The web session 24 can also present dynamic content corresponding to synchronized content that is retrieved from the server 14 by the web session 24. For example, the web session 24 can include control instructions that control a web browser running on a consumer device to periodically or intermittently poll the server 14 for changes in the selected content. By programming the polling period at a sufficiently high rate (e.g., every 5 seconds, every one second, or even less), and assuming a sufficiently fast network connection, the presentation of selected content via the consumer web session can remain synchronized with the media event based on content transferred by the producer to the server via a separate communication link.

Figure 2:
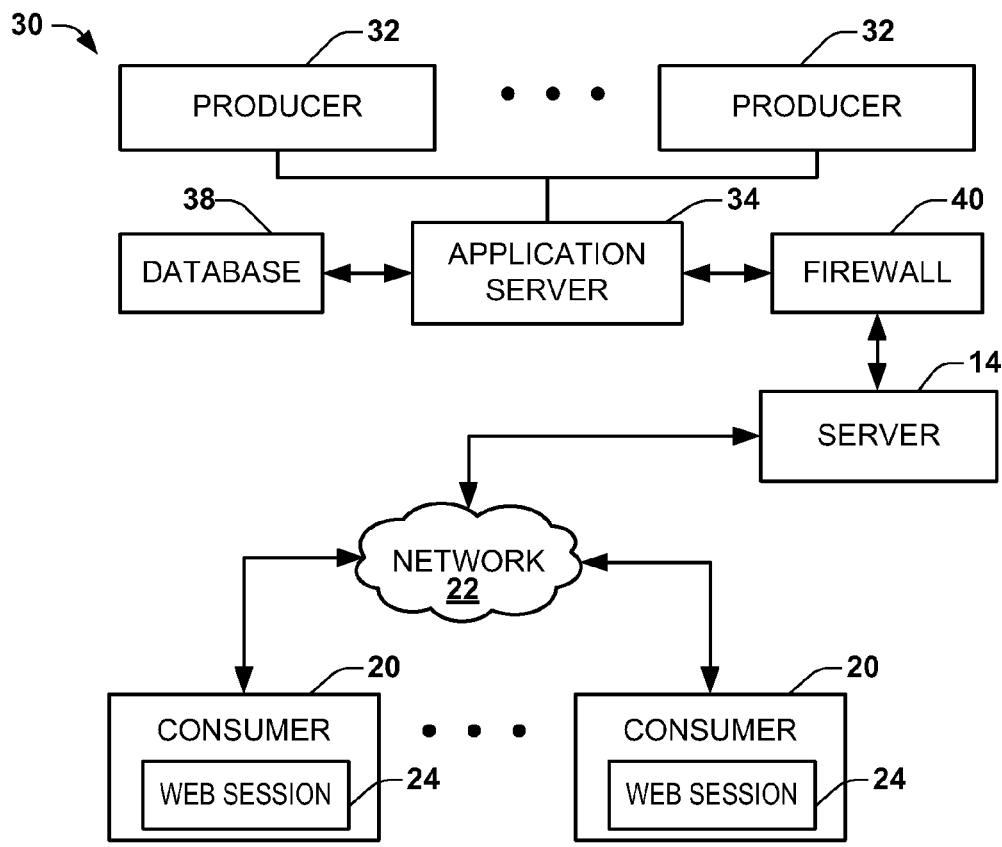
FIG. 2 depicts an example embodiment of another system for synchronizing presentation of information with a media event.

FIG. 2 depicts another example of a system 30 that can be implemented for providing selected content in synchronization with scheduled media events. The system 30 can operate similarly to the system 10 shown and described with respect to FIG. 1 although in a different system architecture at the producer end of the system. Similar components are demonstrated in FIG. 2 by using the same reference numbers introduced with respect to such components in FIG. 1. Accordingly, reference may be made back to the description in FIG. 1 and elsewhere herein for additional information about such components.

In the example of FIG. 2, there can be one or more instance of a producer, indicated at 32. Each producer instance 32 can run on a producer computer that is communicatively coupled to an application server 34. For example, each producer computer can communicate with the application server 34 over a network (e.g., a LAN or WAN), schematically indicated at 36. The application server 34 stores processes and services associated with the producer functionality that can be invoked by users at respective computers via the network 36. The application server 34 can employ a database 38 or other structure for storing data. For example, the database 38 can store content data files and predefined program files for use in conjunction with a plurality of scheduled media events. Thus, instead of each computer coupled to the network having the producer methods and functions installed and locally storing the producer application and content data and programs, the application server 34 and associated database provides a centralized configuration for running the producer in the system 30. Additionally, a firewall 40 can be utilized to isolate the application server 34 from the web server 34. Similar to as described above, each producer application can be programmed to provide multiple streams of synchronized content to the server for concurrent presentation with any number and type of media events.

In view of the two example system architectures depicted in FIGS. 1 and 2, it will be appreciated that various system architectures can be utilized to implement systems and methods shown and described herein. That is, the invention is not limited to any particular architecture.

Figure 3:
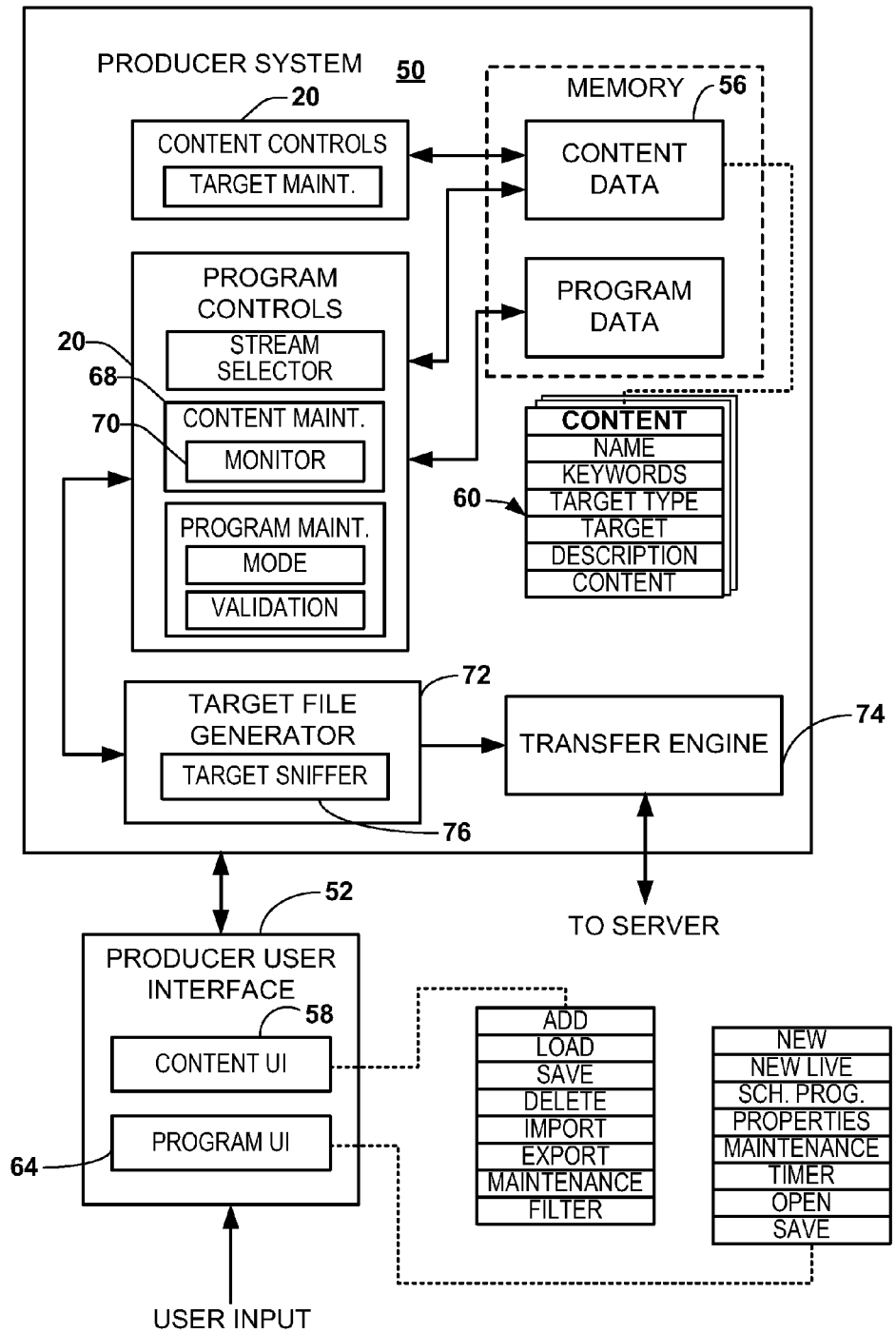
FIG. 3 depicts an example of a producer system that can be implemented according to an embodiment of the invention.

FIG. 3 depicts a block diagram of an example embodiment of a producer system 50. The producer system 50 can include a combination of software components and hardware programmed and configured to select and control transfer of content to a server over the course of a scheduled media event. As described herein, the transfer of content can be performed automatically (e.g., according to a predefined program), manually, or automatic and manual content transfers can be combined. The functionality and controls of the producer system 50 can be accessed via a producer user interface (UI) 52. Security controls can also be employed to limit access to certain features and functionality. The producer user interface 52 can include a plurality of user interface elements (e.g., graphical and text based elements—see, e.g., FIGS. 4 and 5) programmed for implementing functions and methods associated with the producer 50.

The producer system 50 includes content controls 54 programmed to maintain and utilize content data 56 for the producer system. The content controls 54 can work in conjunction with content UI elements 58, which forms part of the producer UI 52. The content UI 58 can include elements that can be invoked, for example, to add content to the content data 56 and to save customized units (or records) of selected content. A set of available content can be represented in a content panel provided with the content UI 58. The content UI 58 can also be utilized to load existing content lists (e.g., that have already been saved) from memory into the content panel. The content panel thus displays a list of available content for synchronization with a given media event.

The content controls 54 can also perform filter functions on content to provide a corresponding filtered subset of the content in the content panel. Those skilled in the art will appreciate various types of filtering that can be employed to limit what content is displayed in the content panel. For example, filtering can include forms of matching, which may involve Boolean operations and wildcards, as are common in keyword searching algorithms and search engines. The content filter function can be accessed via user selection with the content UI 58.

Various other functions can also be utilized to manage content, such as including selecting one or more content records. Selected content may also be deleted from the content panel via the content UI 52. Content can also be imported into producer system 50, such as from a saved content list or from another file having a suitable format (e.g., comma separated value files) for importation. For example, the content controls 54 can be utilized to import a shared file from other producer users or to restore content. Similarly, content controls 54 can be employed to export content as a file that can be stored in memory.

The content controls 54 can also include a content maintenance component 59 that is programmed to perform content maintenance, such as may include adding or modifying content relative to the content data 56. For instance, the content UI 58 can include a content maintenance element (e.g., a dialog box) that can be activated via selection with a user input device, such as activation of the "add" content UI element or a maintenance UI element. Each unit of content (e.g., a content record) 60 in the content data 56 can include content fields (e.g., name, keywords, target type, target, and description) and corresponding content, indicated at 60. Each field in the content record 60 can be modified or appended to by a user via the content maintenance component 59. The target field of the content record 60 can be set to define a selected target in a consumer presentation. Content can be provided for any number of one or more targets for presentation in synchronization a given media event.

The content controls 54 can also include a target maintenance component 61 that is programmed to maintain targets that are available to the system. In general, a target is a construct to control how and where a unit of content will be presented. The target maintenance component 61 can be used to create and modify the types of available targets. There can also be default targets and target types. The target maintenance component 61 can also be employed to create targets and define properties of each target as well as permissible relationships between each target and the type of content that each target can deliver for presentation. The particular type of target can vary depending on the consumer device(s) on which the content is to be presented. Examples of the types of targets include mark-up language (e.g., HTML) snippets, web pages, text, audio, video, graphical images, audio-visual messages as well as combinations thereof. It will be appreciated that a given target can be configured to present more than one type of target. For instance, a single target can be capable of presenting web pages, HTML snippets or other graphical images.

By way of example, the producer system 50 can employ the target maintenance component 61 to establish any number of one or more targets. The content maintenance component 59 can set the target type and target fields for each content record. The target field for a selected content record 60 thus can control how and where the content will be ultimately presented via the consumer web session. The target maintenance component 61 can be employed to create any number of targets. Additionally, the target maintenance component 61 can set multiple targets of the same type with different properties. For example, a HTML snippet or web page can be set as the same type of target but each target can be programmed to have different dimensions (e.g., horizontal and vertical size may be set) for the end consumer presentation.

The content controls 54 can also be utilized to validate whether a selected set of content records that have been assigned a given target and respective content are permissible. Such validation can include an evaluation of whether the identified content is compatible with the specified target and target type. Where a given content record fails the validation a corresponding error message can be provided. Alternatively, if feasible, methods can be employed to convert the specified content to a format that is compatible with the specified target type.

By way of further example, assume a consumer web session is designed to provide a presentation that includes three target areas; namely, a web browser area, a message area and an information area. Thus, the target field of a content record 60 can be set to one of three values, each of which is associated with a respective one of the target areas. As an example, a "Web Browser" value means the content will go to the web browser for display. A "Message" value can be set in the target field of content to present the content in the message area of a web session. An "Information" value can be set in the target field to result in the associated content being displayed in the designated information area of a web session. Those skilled in the art will understand and appreciate that the target names/values identified above are for purposes of example only that that any number and type of target names can be employed to control where and how content is presented at the consumers.

The content field of each content record 60 includes the content that is to be presented to the user at the consumer device. The type of content may be limited by the capabilities of designated target portions of a consumer web session. Thus, each target field and corresponding content field should be set based on the known capabilities for each destination target portion in the consumer web session. Rules can be employed by the content controls 54 to ensure that the type of target does not conflict with the content in the content field. For example, one target portion of a consumer web session may be programmed for displaying text based on content from the server. Another target portion of a consumer web session may be capable of rendering a markup language (e.g., HTML, XHTML). Yet another target portion of a consumer web session may be programmed render a web page based on a resource locator (e.g., URL) that is provided in content retrieved from a server. Additionally, or alternatively, target portions of a consumer web session can be capable of multiple types of presentation, such as those mentioned above as well as others (e.g., presentation of graphics, audio, video and audio-video).

The producer system 50 also includes program controls 62 to facilitate selecting content that is to be transferred to a server via a corresponding network. As described herein, the program controls 62 can be utilized to transfer selected content to the server automatically according to a predefined program. Alternatively or additionally, the program controls 62 can be utilized by a user to manually select and transfer content to the server. A given producer system 50 can support any number of one or more streams, each of which can be associated with a respective media event. The producer system 50 can be implemented to transfer any number of one or more concurrent streams of content. For example, the program controls 62 can be utilized to schedule multiple streams for a given media event, such as to support a variety of different types of consumer devices and/or to provide different types of consumer experiences to appeal to different target audiences. Additionally, or alternatively, the program controls 62 can be utilized to schedule multiple streams for a plurality of different media event that might occur simultaneously or otherwise overlap.

The program controls 62 work in conjunction with a program user interface 64. For instance, the producer interface 52 can include the content user interface 58 and the program user interface 64, such as can be aggregated in a single user interface to facilitate interaction therebetween (e.g., see FIG. 4). The different elements can be arranged in a user configurable manner activated and deactivated according to the type of functionality being implemented. In the example embodiment where the producer system 50 supports multiple concurrent streams of content (e.g., for a single media event or multiple media events), the program controls 62 can include a stream selector 65. The stream selector 65 is employed to select which of the plurality of streams content will be transferred to the server. The content for each stream can be automatically transferred according to a schedule or be transferred manually according to a user selection.

To control whether the content for a given stream is transferred manually or automatically, the program control 62 can also include a program mode component 66. The program mode component 66 is programmed to define whether the producer is operating in a live program or a scheduled program mode for a given media event. The mode can be selected through the program user interface element 64.

If the producer system is operating in the live program mode, selected content for each active stream is transferred to the server for retrieval by consumer web sessions without first creating a corresponding schedule. It will be understood and appreciated that the program control 62 can record all selected content that is transmitted during the live mode, which can be stored as a program. Offset times for content transfers can also be stored in conjunction with the content to enable subsequent play out of stored program in synchronization with a replay media event. It is to be understood that the subsequent replay of the scheduled media event can occur over the same or different type of media than the original media event. For example, an original media event can be a live, in-person event or be provided over a traditional broadcast medium, such as television or radio, while the replay of the event can be provided via the internet, such as via streaming media. Regardless of the manner of replay and media being utilized, the stored program can cause the transfer of recorded content to the server to be synchronized with the replay of the media event according to the offset times that have been stored for each of the selected content relative to the start time.

In order to select content for either a live program or a scheduled program, the program controls 62 employ a content selector 68. The content selector 68 can be utilized to access content records 60 from the content data 56 (e.g., as provided on a content panel of the content user interface 58). The content selector 68 can in turn move content from the content panel of the content user interface 58 to a corresponding program panel of the program user interface 64, such as by performing a drag-and-drop operation with a user input device.

In conjunction with creating a new program, program properties are defined to describe the program being created. The program properties can include the name of the program being created, a keyword field to categorize the program being created, and a loop program field. The loop program field can be utilized to loop a program once the last-scheduled event or unit of selected content in the program has been transferred to the server, the program will repeat. When looping is enabled, a program may repeat any number of times during the media event, such as until an end time for the program is reached or the program is otherwise terminated by a user. A description field can also be used to identify the program on the schedule as well as other descriptive texts for the program. The program properties can be stored for a given program as program data 69.

The program data 69 and the content data 56 may be stored locally in memory the computer device implementing the producer system 50. Alternatively, or additionally, the data 56 and 69 can be stored in memory remotely from the producer system 50 and the user's computer system (e.g., on a network storage device).

As mentioned above, each content record in a program schedule is provided with an offset time that identifies a time at which the selected content is to be transferred to the server relative to a start time of the media event. The start time can be a predetermined start time of the scheduled media event or it can be the start of the program, which can be manually triggered by a user via the program user interface 64 or it can be triggered via a message or instructions received from another software system (e.g., a scheduling system).

The program controls 62 can also include a timer component 71 that can be employed to set the offset times for content. The timer component 71 can be used in conjunction with a prerecorded media event for which the program is to be simulcast. For example, the program user interface 64 can activate the timer component 71, such as the scheduled media event is played out. The content controls 59 can be employed to select content from the content panel that is selectively added to the program panel. In this way, the time on the timer when the content is added to the schedule is set at the timing offset for such content.

The timer component 71 can include associated timer controls, such as user interface elements program to control how the timer is incremented. The timer controls may include a start button that can be utilized to activate and begin incrementing the timer in suitable increments (e.g., one second increments). After the start button has activated the timer, additional user interface elements, such as a stop button or a pause button, can also be selectively activated by the user. For instance, the stop button can stop the incrementing of the timer and reset its value back to zero. By contrast, the pause button can control incrementing the timer without resetting the timer value. It is to be understood and appreciated that the timer functionality can be integrated with audio and video editing software such that the starting, stopping and playing and pausing of the media (corresponding to the scheduled media event) can be utilized to control the timer functions accordingly.

The program controls 62 can also include a monitor function 70 that can be utilized to monitor data streams associated with a given media event. For instance, the monitor function 70 can be implemented software programmed provide information that identifies content for each target that is being delivered for a given stream. The program user interface 58 can include user interface elements to enable a user to selectively display such content for each stream that is being presented. The monitor function 70 can filter data that is provided with the media during a live event or as the scheduled media event is played out. The monitor may be part of the content selector 68 or otherwise run as a separate application that filters and parses the data for relevant information.

While the content data 56 has been described as being selected manually for a given media event, it will be appreciated that the program controls 62 can programmatically identify and select content that is transferred to the server. For example, the content selector 68 of the program controls 62 can employ a search engine to locate possibly relative content via the web and return the results to the producer system 50. One or more of the results can be appended to the 56 content data and added to the program panel for delivery, such as described herein. Additionally or alternatively, the results can be stored as one or more content records and transferred to the server in real time.

As another example, RSS feeds and/or closed-captioned information may be read by the content selector 68 to ascertain relevant keywords from such streams. These keywords can be employed for selecting content for transfer to the server in synchronization with the media event. Those skilled in the art will understand and appreciate various ways to implement the monitoring of data streams that are provided with the scheduled media event, which may vary according to the type of media. It will be further appreciated that the content for each stream for a given media event can be selected by different means (e.g., automatic means and manual means).

The producer system 50 also includes a target file generator 72 that is programmed to generate a target file based upon selected content that the program controls send to the server. The target file generator 72 thus is programmed to package a selected content record in a file for and provide the file to a transfer engine 74. As described herein, the producer system 50 can employ any number of one or more targets for each given stream. Accordingly, the target file generator 72 can generate a target file having a name that is set according to a predefined nomenclature. The name of the file can be set based on the target value in the content record being transferred. For example, the target file generator 72 can include a target sniffer 76 that determines the properties of the file, such as a file name, according to the value of the target field in the content record. As one example, the target generator can generate the target files as XML documents or files that are to be transferred to and stored in a corresponding folder of the server.

The transfer engine 74 can be hardware and/or software that is programmed and configured to send target files from the target generator 72 to the server. For example, the transfer engine 74 can employ a network protocol (e.g., File Transfer Protocol (FTP)) to transfer the target files over an IP computer network, such as the internet. For example, the transfer engine can employ FTP running over the transmission control protocol (TCP)/IP transport layer.

Figure 4:
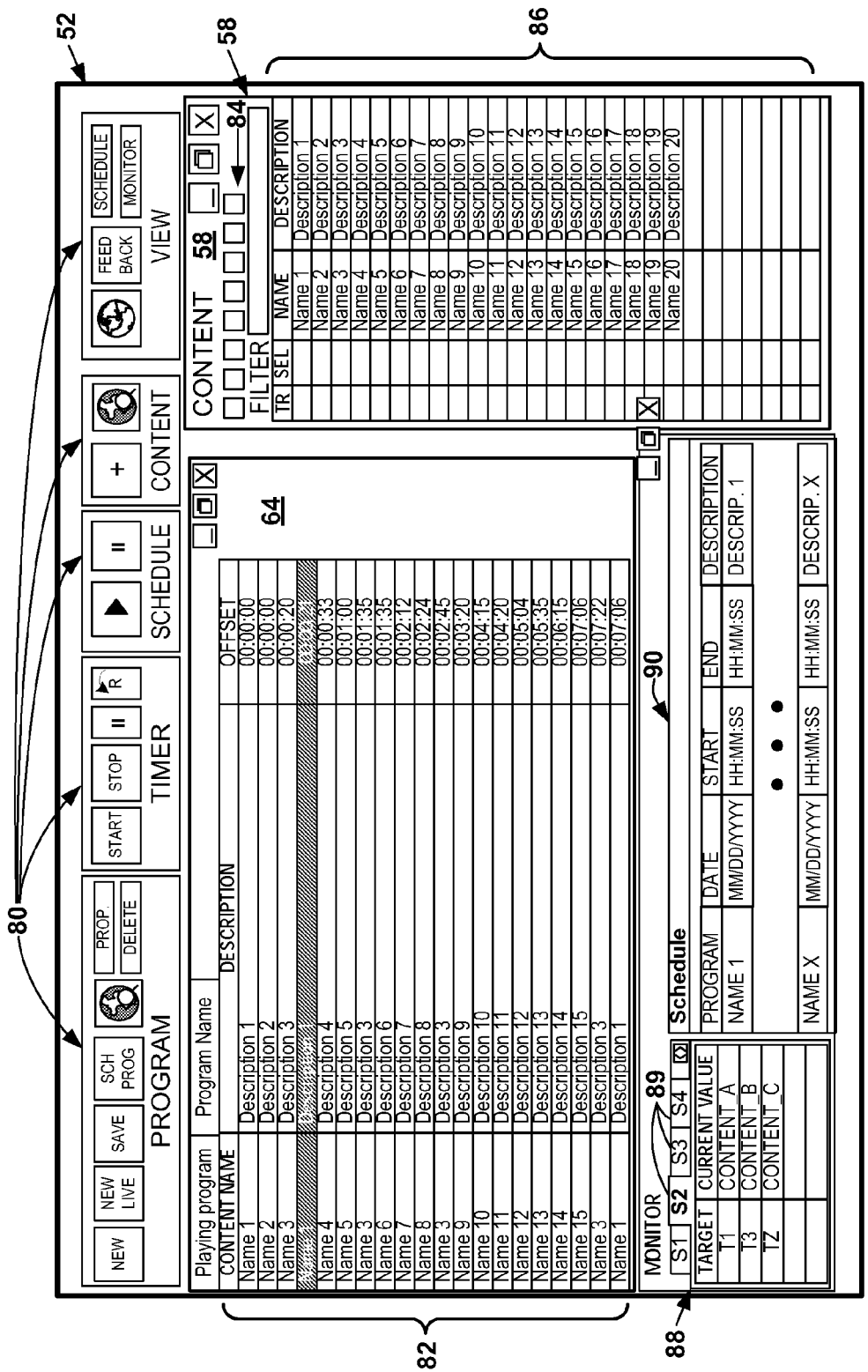
FIG. 4 depicts an example of a producer user interface, which can be implemented according to an embodiment of the invention, illustrating a scheduled program and content available for a scheduled media event.

By way of further example, FIG. 4 depicts an example of a producer user interface 52 that includes content UI elements 58 and program user interface elements 64. In the example of FIG. 4, the producer UI 52 is depicted as including an arrangement of buttons 80 and a program panel 82 that can be employed to control program functions, such as described herein. The content UI elements 58 similarly are demonstrated as including an arrangement of buttons 84 and a content panel 86 that can be utilized to control adding and maintenance of content, such as described herein.

The producer user interface 52 can also include a monitor user interface 88 that can display information about content being presented for each target of a selected stream 89. In the example of FIG. 4, four streams 89, indicated at S1, S2, S3 and S4, are shown, from which stream S2 has been selected as to display the current information for three associated targets T1, T3 and TZ. As described herein, there can be any number of one or more streams 89 for a given media event, each of which streams can include one or more targets that are used to present content to a corresponding target portion of a consumer user interface in synchronization with the given media event. For example, the current value of information displayed in the monitor UI 88 can be obtained from selected content fields (e.g., the name and description fields) of the respective target content files that are being provided by the server during the media event.

The monitor user interface 88 can also include a schedule user interface element 90 that displays program schedule information for the selected stream 89, which can include the program name, date, start time, end time, and a description. Other information associated with a given stream or target can also be supplied via the schedule user interface element 90, such as an identity or name of a producer-user that can control the stream and an indicator of network connectivity. For instance, it may be desirable to restrict control of targets for a given stream to a single user to avoid multiple users modifying content simultaneously.

Figure 5:
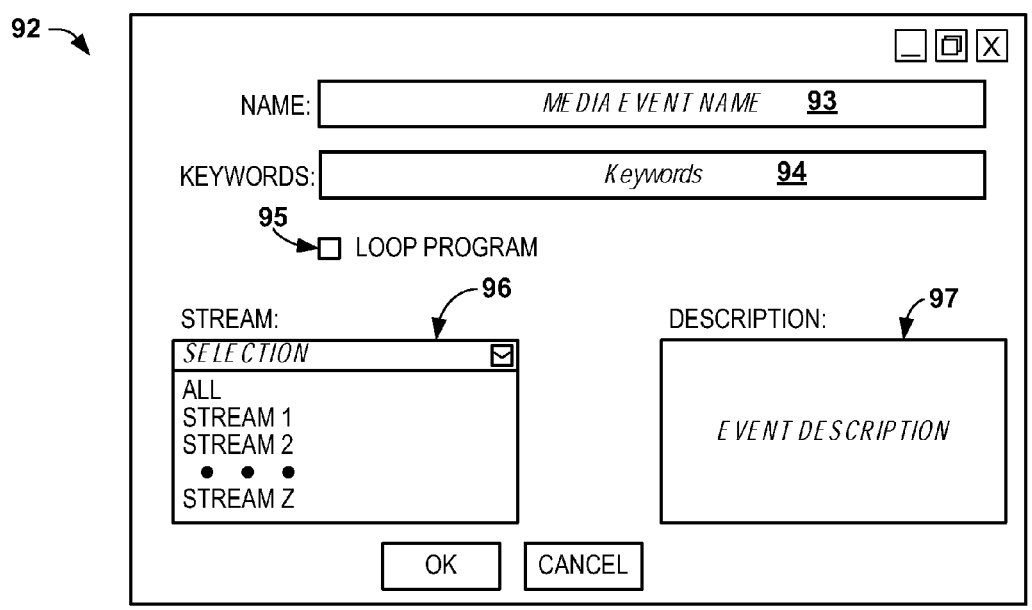
FIG. 5 depicts an example of another producer user interface dialog for setting program properties according to an embodiment of the invention.

FIG. 5 depicts an example of a program maintenance UI dialog 92 that can be activated in response to activating a program UI element from a program user interface. The program maintenance UI dialog 92 can be used to enter properties for a new program or to modify properties for an existing program. For instance, the program maintenance UI dialog 92 can include a field 93 for identifying a name for an associated media event. Another field 94 can be employed to specify keywords associated with the program or the media event, such as title, names of people, genre, topic or the like. The program maintenance UI dialog 92 also includes a selection box 95 that can be set to control whether the program will loop or play through and end when completed. A stream selection user interface element 96 also is provided to identify which one or more available streams will be active during the media event. A description entry can also be provided in a description dialog box 97 to supply additional information about the program and/or the media event.

Figure 6:
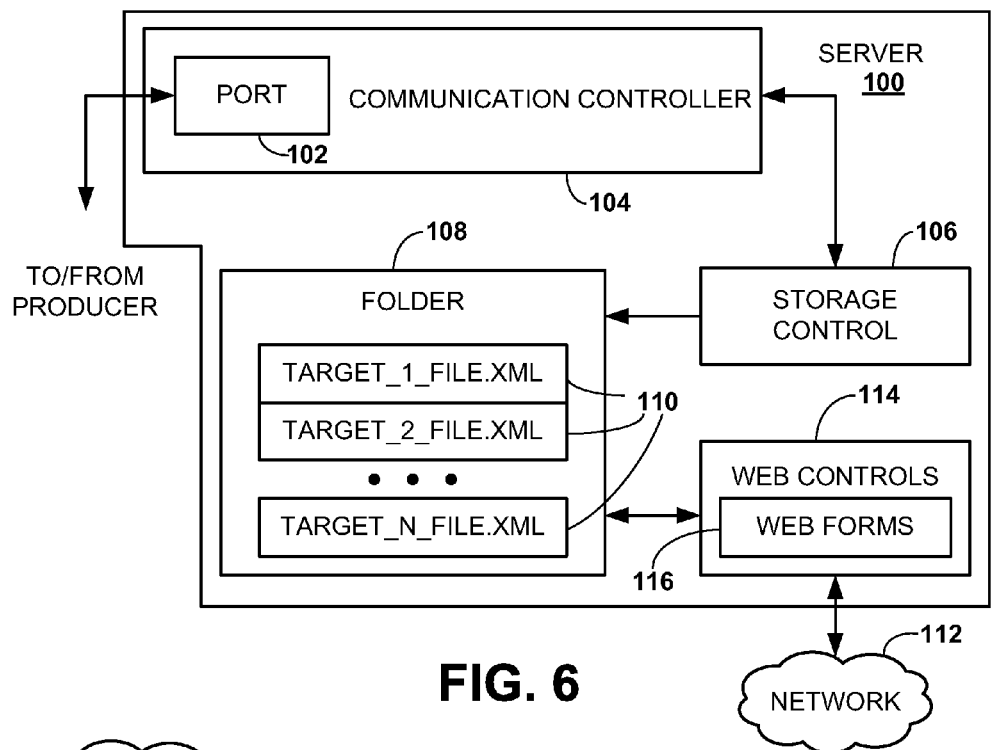
FIG. 6 depicts an example a server system that can be implemented according to an embodiment of the invention.

FIG. 6 depicts an example of a server system 100 that can be employed for providing content to consumers via a network 112. Referring back to FIG. 3, the transfer engine 74 can send the target files to a pre-identified port 102 at the server 100. A communications controller 104 can receive requests from the transfer engine 74 and provide responses to facilitate the transfer of files from the producer system to the server 100. Those skilled in the art will understand and appreciate various modes of operation that can be utilized to transfer data from the producer to the server 100, such as including active mode and passive mode for FTP exchange of data.

The server 100 can include a storage control 106 that is programmed to store the incoming target file in a folder (or other data storage structure) 108 that resides in the server 100 at a predefined resource location (e.g., URL) associated with a given media event. As demonstrated in FIG. 6, the folder 108 contains N target files, each of which can be an XML file. In this example, each of the N XML files contains content that can be retrieved via an associated network (e.g., the internet) 110 by a consumer web session. By employing a corresponding transport protocol for transferring content from the producer to the server 100, the target files 110 in the folder can be updated by the producer in substantially real time during the scheduled media event. Since the target files 110 are updated in synchronization with the media event, the consumer web session can periodically or intermittently poll the target files and retrieve content. As a result, the consumer web session can include target presentations based on the content in the target files 110, which are also in synchronization with the media event.

The server 100 also includes a set of web controls 114 associated with the simulcast of the selected content from the producer. The web controls 114 can include web forms 116 that can be accessed by a consumer device, such as at an identified resource location corresponding to a file. The resource file can contain static mark-up documents as well as web controls and user controls according to where static and dynamic content for the page has been placed.

As an example, the consumer can be provided a URL corresponding to an ASPX file located at the server 100. The ASPX file can enable static and dynamic content to be provided to the user according to the .NET framework developed and marketed by Microsoft Corporation of Redmond, Wash. Thus, the web forms 116 can be designed to provide a predetermined number and arrangement of target areas for presentation in the consumer web session.

While a single folder 108 and set of web controls 114 are described with respect to FIG. 6, it will be understood and appreciated that the server can (and typically will) push synchronized content (for each of a plurality of targets) to consumers for any number of one or more primary media events. Similarly, a given producer can also be programmed to transfer selected content for any number of one or more targets for each of a plurality of different media events. Additionally, since different consumer devices may have different presentation capabilities and operating requirements, more than one stream can be provided for a given media event, such as to accommodate different types of consumer devices.

Figure 7:
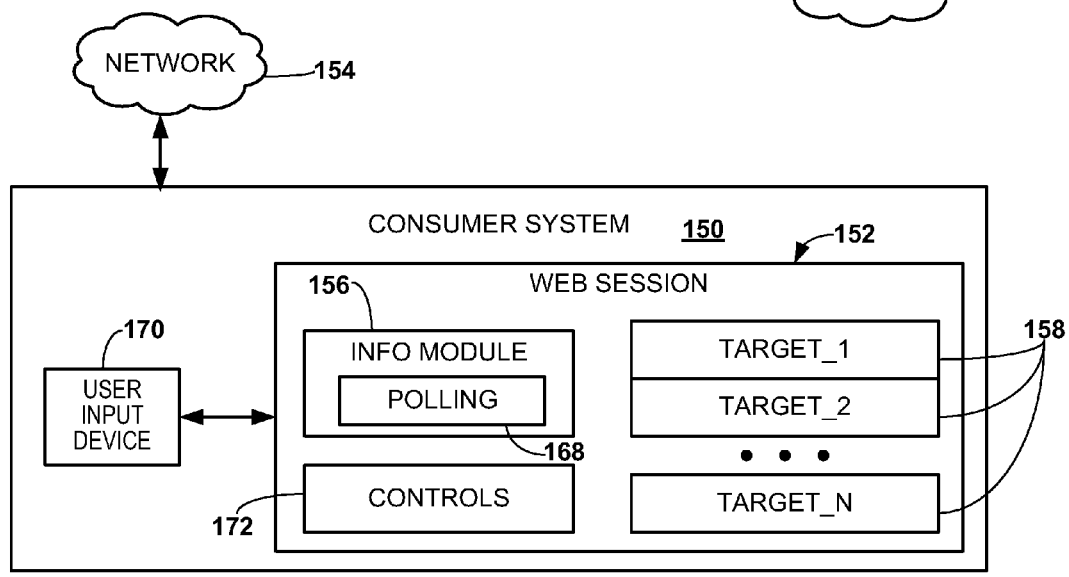
FIG. 7 depicts an example of a consumer system that can be implemented according to an embodiment of the invention.

FIG. 7 depicts a functional block diagram of an example of a consumer system 150. The consumer system 150 can be implemented at a computer, which may be a personal computer, PDA, cellular telephone, laptop or workstation. The consumer system 150 can initiate a request for a predefined resource on a server, such as the server 100 shown and described with respect to FIG. 6. Web forms and controls can be returned to the consumer system 150 for initiating a consumer web session 152. For instance, the request can be sent from the consumer system 150 to the server via a network 154 using TCP/IP or other known network protocols.

The web session 152 can include static text and graphic content arranged in a desired manner, such as in a browser application that is running on the consumer system 150. The web session 152 can also include dynamic content according to instructions retrieved from the server via the network 154. For example, the web session 152 can implement an information module 156, such as can be initiated via web forms (e.g., an ASPX file) retrieved from the server. Instructions associated with the information module 156 can cause files (e.g., including the target files 110 from FIG. 6) containing content to be retrieved from the server and used to populate target portions 158 of the web session 152 with selected content for presentation to the consumer in synchronization with a given media event.

In the example of FIG. 7, the web session 152 includes N target portions 158, each of which can be populated with corresponding content from a respective one of the target files 110 that is retrieved from the server 100 (FIG. 6). For instance, selected content in target_1_file.XML (stored on the server) can be retrieved by the consumer system 150 and populate TARGET_1 in the web session 152 with content for presentation to the consumer. Other content can be acquired from respective target files for synchronized presentation via other target portions of the consumer web session 152.

The information module 156 can also include a polling function 168 that includes instructions to cause the web session to periodically send a request to a known location (e.g., a URL corresponding to the folder containing the target files 110) for the target files at the server. For example, in response to determining that one or more target files have changed, the selected content in such target files can be retrieved to refresh the respective target portions 158. The polling can be implemented at a sufficiently short interval so that the content presented in the target portions 158 remains relevant to the information being provided with the media event.

The level of consumer interaction via the web session 152 can vary according to wishes of the consumer. For instance, during an active web session 152 existing concurrently with the media event, a user-consumer can sit back and simply experience the presentation at the consumer system that has been produced. Additionally, or alternatively, the user can interact with the web session via a user interface device (e.g., mouse, touch screen, or other pointing device) 170. Assuming that one of the target portions 158 is a web page, for example, a user can employ the user interface device 170 to navigate web pages sent by following links, entering information, and doing other functions typically available on the internet. The web session 152 may also include controls 172 that provide additional functionality to enhance the consumer experience. For instance, a user can utilize the user input device 170 to activate selected controls 172, such as may be provided as a toolbar integrated in the web session 152. The controls 172 can provide enhanced functionality associated with the web session 152, such as may include controlling presentation (e.g., pausing, refreshing, viewing history, opening a web page in a new window and the like) for one or more of the targets 158.

It will be further appreciated that a given consumer system 150 can implement more than one web session 152 concurrently. For instance, a user can employ the consumer system 150 to implement one web session 152 for a first media event and a second, separate web session for a different media event, which can be provided in a separate instance of the user's browser.

Figure 8:
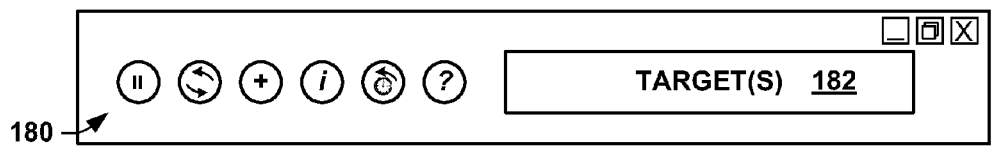
FIG. 8 depicts an example of part of a consumer session that can be implemented according to an embodiment of the invention.

By way of example, FIG. 8 depicts an example of a control interface 180 that can be provided as part of or otherwise associated with a consumer web session (e.g., web session 152 of FIG. 7). For instance, the control interface 180 can be implemented as a toolbar 180 that includes a plurality of user interface elements, such as buttons, drop down lists or other features for activating corresponding controls. In the example illustrated in FIG. 8, control interface can include buttons for pausing the web session, for refreshing the currently displayed page, for displaying the selected page in a new window of the user's browser, for accessing information, for viewing history as well as for accessing online help associated with the controls. One or more target area 182 can also be provided as part of the control user interface element, such as adjacent to the control toolbar 180. For example, the target area can be implemented as a window programmed for presenting one or more type of target, such as text (e.g., a target message), which can be updated based on polling information stored at the server in a corresponding target file, such as described herein. It will be appreciated that the control tool bar 180 can be implemented in the web session with other types of target content or without any content.

Figure 9:
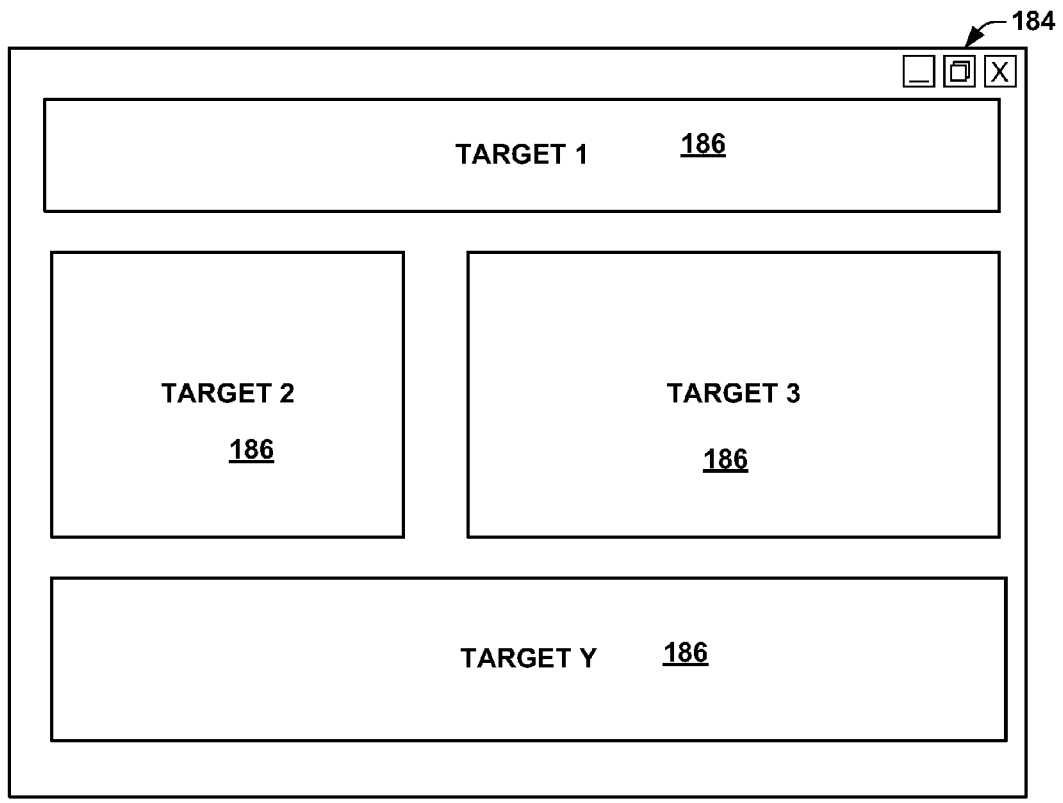
FIG. 9 depicts an example of another part of a consumer session, which can be implemented according to an embodiment of the invention, illustrating a target presentation and some interactive consumer controls available for the consumer session.

As a further example, FIG. 9 depicts an example a presentation 184 that can be provided as part of a consumer web session to provide an enhanced consumer experience simulcast with a scheduled media event. As demonstrated, the presentation 184 can include a plurality of target areas 186, each of which can be updated individually with information in synchronization with the media event. As described herein, the updates can be predefined in a schedule as set via a producer system. Alternatively or additionally, a producer-user can manually transfer content to the server in synchronization with the media event, which content is utilized to selectively update each respective target 186. It will be understood and appreciated that each individual target area can be updated at different times or remain static during the media event so that the overall consumer experience provided by the presentation 184 follows or tracks the media event in a desired manner. The size of the target areas further can be different and can also vary during the web session according to the amount and type of content that is to be presented.

Referring back to FIG. 7, the controls 172 in the web session 152 can further include instructions to store and maintain a log of information describing all content that is presented at the consumer system 150 during each web session. The log, for example, can include any or all of the fields in each content record, such as described herein.

Figure 10:
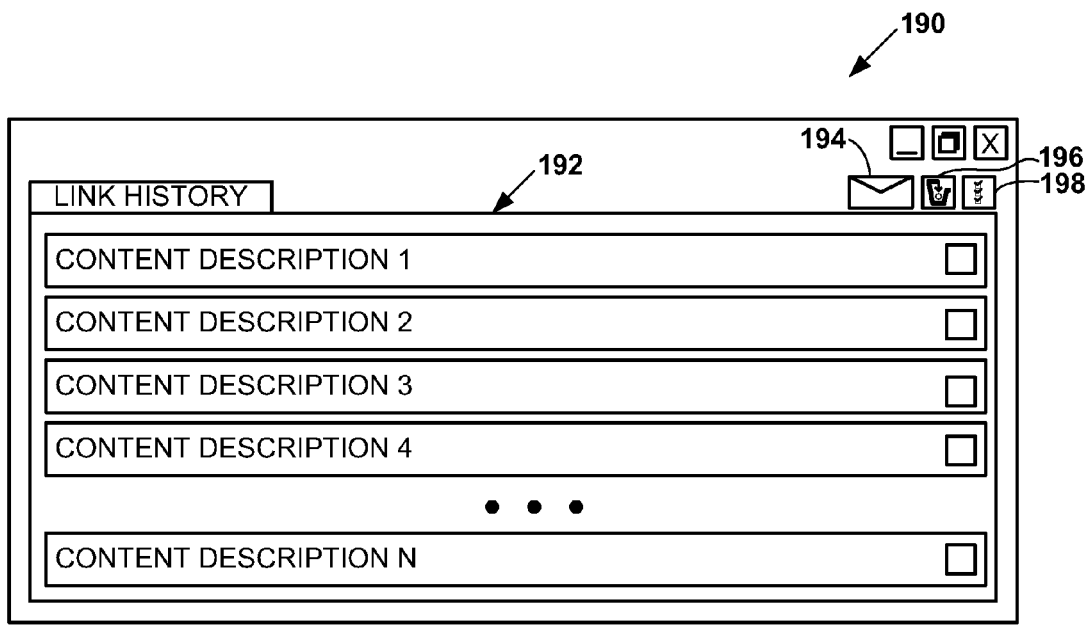
FIG. 10 depicts an example of yet another part of a consumer session, which can be implemented according to an embodiment of the invention, illustrating a link history and related controls.

By way of illustration, FIG. 10 depicts an example of a link history user interface 190 that can be provided as part of a web session, such as in response to activating a history user interface element in the control toolbar. In this example, only a portion of content fields sent with the target files from the producer are provided in the link history, such as to provide information relevant to the user (e.g., the content description field and name field from a content record). A user thus can select one or more of the identified units of content via a user input device, such as a mouse, touchscreen or keyboard.

The link history user interface 190 also includes user interface elements, such as in the form of buttons, which can be activated to perform additional functions on one or more selected links. For example, a mail user interface element 194 can be activated to open an email dialog associated with the consumer's email program for sending the selected links to one or more recipients. A delete user interface element 196 can also be activated to delete selected content from the log that provides the links history user interface 190. Another user interface element 198 can also be provided to select and deselect content contained in the links history. The log 192 of relevant links provides a convenient mechanism for a user to return to any of the pages that were displayed during the web session at a later time without having to remember or write down the names of the web pages or URLs.

Figure 11:
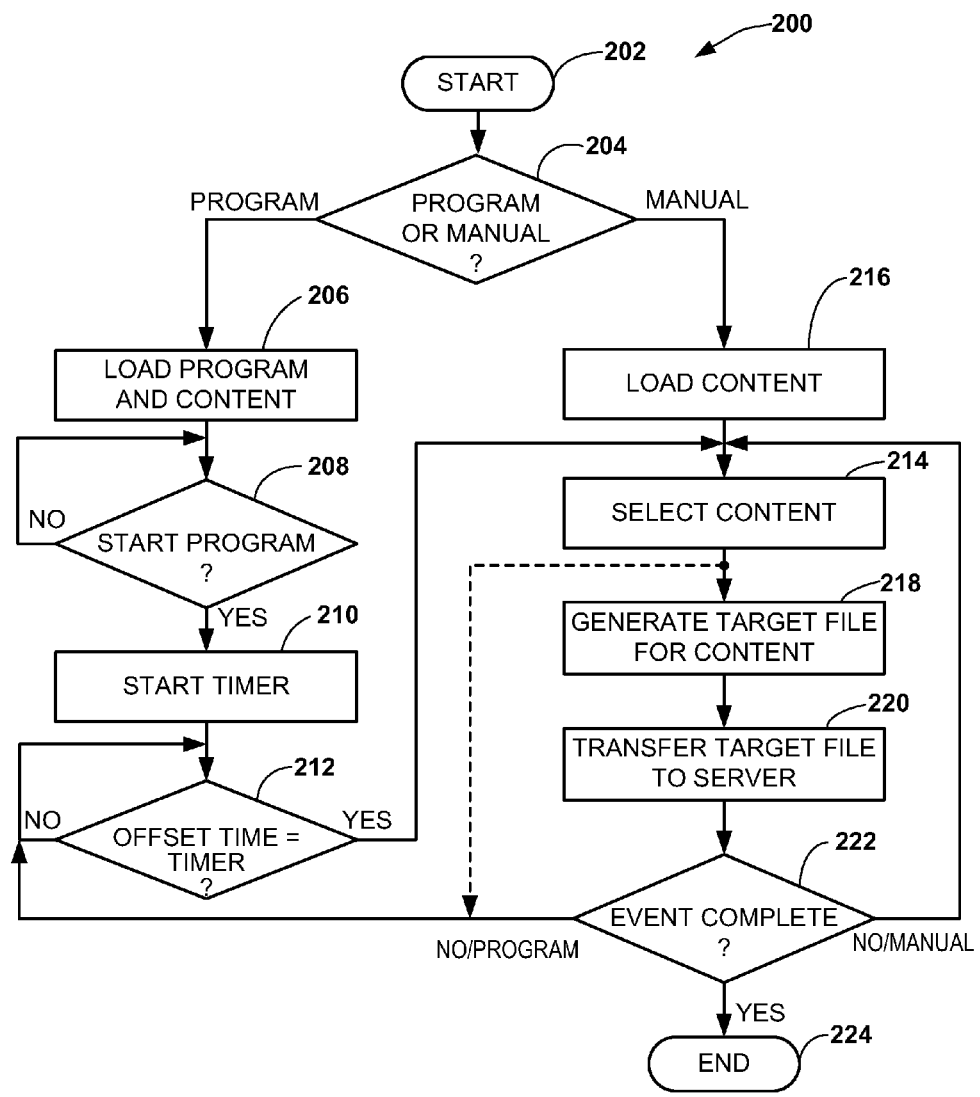
FIG. 11 is a flow diagram of a method for implementing certain functionality associated with a producer according to an embodiment of the invention.

FIG. 11 depicts an example of a method for implementing certain functionality associated with a producer. The method 200 begins at 202 in which producer methods and functions are activated and instantiated on a computing device. The producer application can be a local application or provided to a workstation via a network. A user can interact with the methods and functions associated with the producer functionality via a user interface such as shown and described herein. At 204, a determination is made as to whether the presentation of simulcast content is to be performed automatically via a program, manually via user selections or as a combination of program and manual content. If a program is to be used utilized, the method proceeds to 206 in which the program and content is loaded into memory. The content and schedule information associated with a program can be presented to the user via the program interface, such as displayed in a program panel and content panel (see, e.g., FIG. 4).

At 208, a determination is made as to whether the program has started. If the program has not started the scheduler can loop or otherwise wait until the program has reached a designated start time. The program can start automatically at its scheduled time. Alternatively, a program can be initiated manually by activation through a user interface. Once the program has begun, at 210, a corresponding program timer is started. The program timer runs concurrently with the scheduled event such as counting up (or alternatively down) from the start of the program determined at 208. At 212, a determination is made as to whether the offset time associated with content that is to be transferred to the server is equal to the program timer. If the offset time for content does not equal to the server no additional action is required and the method can loop back to 212. If the offset time for one or more units of content is equal to the current timer value, the method can proceed to 214 for transferring content.

Referring back to 204, if a manual selection mode for content has been selected, an appropriate set of content can be loaded into memory and made available via the user interface device, indicated at 216. The content, for example, can be presented in a content panel of the producer user interface. At 214, content can be selected manually by the user via user interface, such as by dragging content from the content panel into a program panel window of the producer user interface or by otherwise selecting content from a list of available content. Additionally, as described herein, the content loaded at 206 or 216 can represent a predefined or prearranged set of content that is relevant to the scheduled media event for which the content is to be presented in simulcast manner.

In response to content being selected at 214 (either manually or automatically via the program), a corresponding target file is generated for the selected content, indicated at 218. The target file can contain the content itself (e.g., text, an image, HTML snippet or the like) that is to be presented or an identifier for such content (e.g., a web address for a web page or a link to an image) that is to be presented at a consumer web session. The file generated at 218 can be generated as an XML document according to a defined XML schema.

At 220, the target file is transferred to a server to facilitate retrieval and presentation of the content at any number of consumer web sessions. For example, the target files can be transferred using an FTP protocol.

At 222, a determination is made as to whether the corresponding scheduled event is completed. If the event is not completed, portions of the method 200 can be repeated. For example, for a scheduled program of preselected content, if the event is not complete, the method can return to 212 to determine when to send the next unit (or units) of content to the server. Similarly, for a manual production, if the event is not complete, the method can return from 222 back to 214 for selecting content manually that is to be sent to the server. After the event has been completed, the method can end at 224.

It is to be understood and appreciated that at the end of the event, the producer application running on the user computer can remain open and active. For instance, there may be reasons that a user may wish to send additional information and content to the consumers after the completion of the scheduled media event. As described herein, there can be any number of one or more streams, each of which can transfer target files for any number of one or more targets. The streams can further be utilized to transfer the content for the same or different media events. A separate producer method 200 can be implemented for each such stream.

Figure 12:
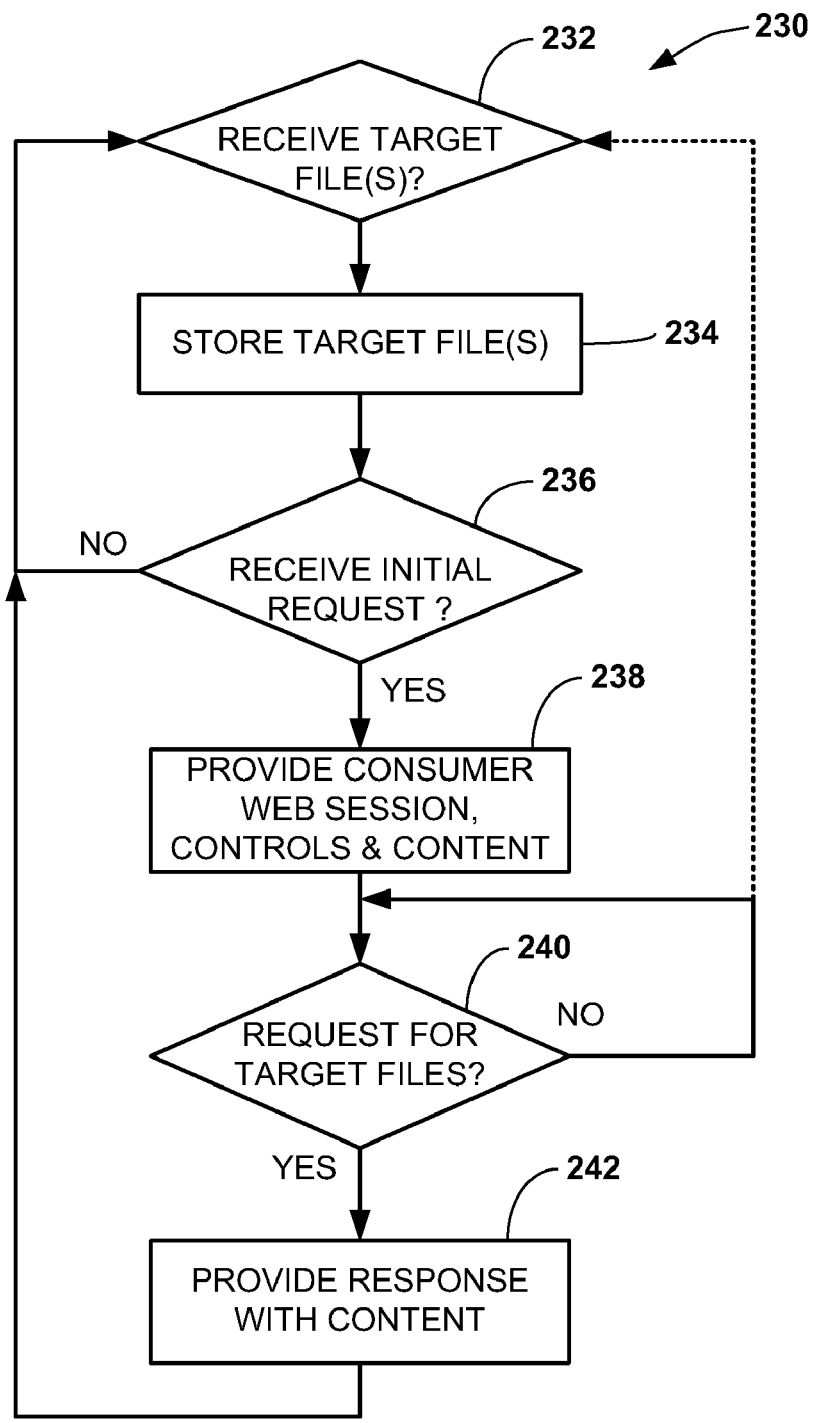
FIG. 12 is a flow diagram of a method of server functionality that can be implemented according to an embodiment of the invention.

FIG. 12 depicts an example method 230 that can be performed for a server implemented as a web server. As used herein, the web server can correspond to an application program or set of applications running on a computer coupled to a network or, alternatively, a web server can correspond to the computer itself. The web server is programmed to perform functionality associated with storing and processing requests and providing responses, such as can include static and dynamic content (e.g., in the form of web pages or other information).

At 232, the determination is made as to whether target files have been received. This determination can be processed by a communications engine configured and programmed to receive one or more target files from a producer, such as can be communicatively coupled to the web server (e.g., via a network) or otherwise be connected to or be implemented as part of the computer running the server. While in the following example associated with FIG. 12 the functionality of the method 230 will be described with respect to providing content for a single media event, it will be understood and appreciated that a single web server is capable of storing target files and concurrently serving web pages and other information associated with a plurality of different media events. As an example, a broadcast service provider can broadcast audio and/or video information for a single channel, which can include a plurality of different programs over a time period. The server performing the method 230 can operate to store and provide content for one or more of the programs broadcast by the provider. Alternatively, a service provider may broadcast over multiple channels, which can include one or more different types of media and/or live events. The server can accommodate providing content for each media event, including concurrently for different media events that occur simultaneously or otherwise overlap.

At 234, the target files that were received are stored in memory. For instance, the target files can be stored in a folder residing in memory accessible by the server implementing the method 230. The files can be stored in the folder that is associated with a given media event or a channel over which the media event may be broadcast. The folder can include one or more a location for storing target files, each of which can be identified by a respective resource identifier, such as a URL.

At 236 a determination is made as to whether an initial request from a consumer has been received. If the request has not been received at 236 (NO), the methodology 230 can return to 232 for receiving one or more target files. It is to be understood that the functionality associated with receiving the target files and storing the target files can run independently from the processing of requests and serving data that is associated with other portions of the method 230.

In response to receiving an initial request from a consumer, the method proceeds from 236 to 238. At 238, consumer web session controls and appropriate content is provided as part of a response from the server. The consumer web session, for example, can be provided to the consumer as a .ASPX page. This page can include controls or other applications or applets as well as static content for the web page or pages being displayed. The web session can be provided on a web browser running at the client's advice.

As described herein, the same web session can be provided to any number of consumers according to the capacity of the web server. Thus depending upon the estimated capacity, the computer or computer systems implementing the method 230 can run on multiple computer devices.

For each given consumer to which the web session is provided, the consumer web session employs controls and other functionality (provided at 238) to periodically poll the server for updates with respect to the target files that have been received from the producer. At 240, a determination is made at the server as to whether a request has been received for target files from such a consumer web session. If there is no additional request for files, the method can loop at 240 or, alternatively, the method can return to 232 for receiving additional target files as indicated by the dotted line. In response to receiving a request for target files at 240, the method proceeds to 242 in which appropriate response is provided.

At 242, the response can include additional content that has been stored in one or more of the target files that may have been modified since the last request from the consumer. The controls associated with determining whether the content has been modified in the target files at the server can be performed at the consumer device in response to response data (e.g., a time stamp) associated with the target files in a corresponding response. Alternatively or additionally, such functionality can be maintained at the server such that the initial response to the request at 240 includes updated content or an indication that no updated content exist. From 242 the method can return to 232 for repeating the process.

Figure 13:
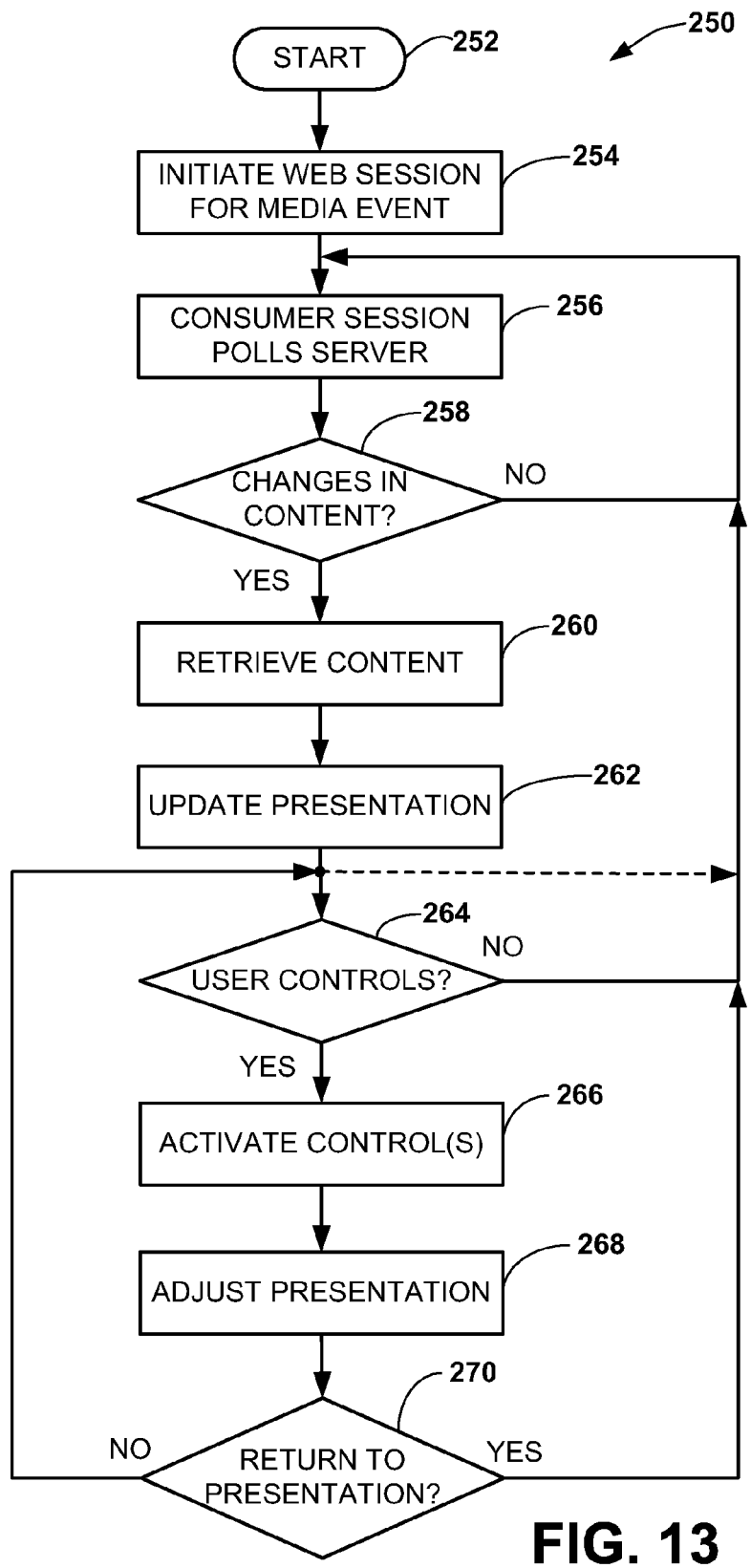
FIG. 13 is a flow diagram of a method for acquiring and presenting content to a consumer according to an embodiment of the invention.

FIG. 13 depicts an example of a method 250 that can be implemented at a consumer device for acquiring and presenting content to a consumer user in synchronization with a given media event. As described herein, the consumer can correspond to a consumer application or a set of applications or other code running on a computing device or to the computing device itself on which the method 250 may be implemented. The method 250 begins at 252 in conjunction with a user activating a link via a web browser or other program corresponding to a resource identifier for a simulcast for the media event. Such a resource identifier can be accessed via another web page, an email program or other means that can be utilized for providing users with means for linking to the simulcast web session for the scheduled media event.

At 254, a web session is initiated and appropriate controls associated with the session are received and activated at the consumer. At 256, the consumer session polls the server for content. The polling can be performed at a desired rate which may be a periodic time, (e.g., every five seconds or every one second or at a different rate), which can be defined for each target via the controls received at 254. Additionally, the time period can vary throughout the web session, which can also be defined in the controls. At 258, a determination is made as to whether there is any change in the content that was received at 254. If there is no change in the content (NO), the method can return to 256 for subsequent polling. If it has been determined that content has changed (YES), the method can proceed from 258 to 260.

At 260, a request for content can be issued and the appropriate content can be retrieved from the server. The content can correspond to one or more the target files or at least a portion thereof that has been stored in a folder at a predetermined location. At 262, the presentation on the consumer is updated in response to the retrieved content. The update can include changing text, graphics, video and/or audio, such as may be associated with one or more respective target portions of the consumer web session. After updating the presentation at 262, the method can proceed to 264. Additionally, the method can return to 256 and run as a separate thread or loop in parallel with the processing and display of the user controls.

At 264, a determination is made as to whether any user controls have been activated. Additionally, At 264, if it is determined that the user controls have been activated such as pause, link history, opening a new window for a given link or the like, the method proceeds from 264 to 266. At 266, the selected user controls are activated. The type of activation and functionality performed can vary from control to control.

At 268, the presentation associated with the web session is adjusted according to the controls that are activated. For example, should a user choose to pause the presentation, the update of the presentation can be disabled temporarily for the consumer to control. While paused, the retrieval of content can run in the background to maintain synchronization with the media event and facilitate updating the presentation when the pause control is deactivated. Alternatively, the retrieval of content and updating can be suspended. Additional controls can be available to refresh or return to the live presentation of content associated with the method 250.

At 270, a determination can be made as to whether to return to the presentation, such as can be made based on activation of appropriate controls or deactivation of other controls. In response to returning to the presentation, the method can proceed from 270 back to 256 to repeat the process. Alternatively, the method can return to 262 if the polling is continued during the process. In this way, the user can control his/her experience associated with the presentation of content while the presentation continues at the web server according to target files and content that are transferred and stored at the server by the producer. If the user chooses not to return to the presentation, the method can continue to process user controls. It will be appreciated that the user controls can be applied to some targets as selected by the user. For instance, the controls may affect one or more targets, while one or more other targets can continue to be updated unaffected by the controls.

It is to be understood that certain controls may be implemented, as desired by the provider, to disable certain types of presentation updates so that the client and/or user as the consumer can control the overall experience. Thus, while the same content is available and retrieved by multiple consumers in a similar manner, the individual experience at each consumer web session can be individualized depending on the level of interaction by the end user.

In view of the foregoing structural and functional description, those skilled in the art will appreciate that portions of the invention may be embodied as a method, data processing system, or computer program product. Accordingly, these portions of the present invention may take the form of an entirely hardware embodiment, an entirely software embodiment, or an embodiment combining software and hardware, such as shown and described with respect to the computer system of FIG. 14. Furthermore, portions of the invention may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments of the invention have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 14:
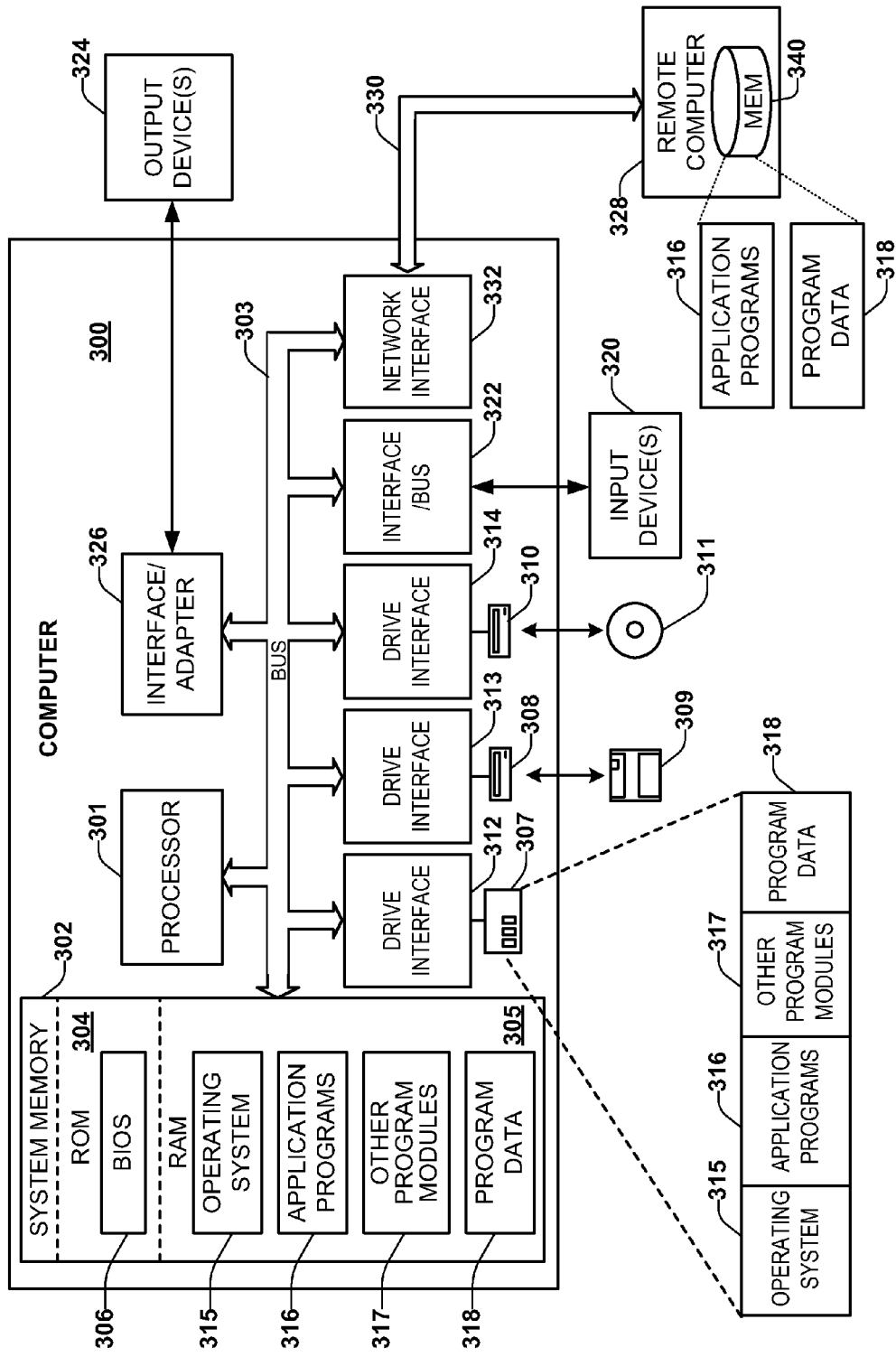
FIG. 14 depicts an example computing environment that can be used in performing methods and workflows according to an aspect of the invention

In this regard, FIG. 14 illustrates one example of a basic computer system 300 that can be employed to execute one or more embodiments of the invention, such as including the producer, server as well as the consumer portions employed in the systems, user interfaces and methods described herein (see, e.g., FIGS. 1-13). The computer system 300 can be implemented on one or more general purpose networked computer systems, embedded computer systems, routers, switches, server devices, client devices, various intermediate devices/nodes or stand alone computer systems. Additionally, computer system 300 (or portions thereof) can be implemented on various mobile devices such as, for example, a personal digital assistant (PDA), laptop computer, smart cellular telephone, and the like, provided it includes sufficient processing capabilities and means for enabling suitable network communications.

Computer system 300 includes processing unit 301, system memory 302, and system bus 303 that couples various system components, including the system memory, to processing unit 301. Dual microprocessors and other multi-processor architectures also can be used as processing unit 301. System bus 303 may be any of several types of bus structure including a memory bus or memory controller, a peripheral bus, and a local bus using any of a variety of bus architectures. System memory 302 includes read only memory (ROM) 304 and random access memory (RAM) 305. A basic input/output system (BIOS) 306 can reside in ROM 304 containing the basic routines that help to transfer information among elements within computer system 300.

Computer system 300 can include a hard disk drive 307, magnetic disk drive 308, e.g., to read from or write to removable disk 309, and an optical disk drive 310, e.g., for reading CD-ROM disk 311 or to read from or write to other optical media. Hard disk drive 307, magnetic disk drive 308, and optical disk drive 310 are connected to system bus 303 by a hard disk drive interface 312, a magnetic disk drive interface 313, and an optical drive interface 314, respectively. The drives and their associated computer-readable media provide nonvolatile storage of data, data structures, and computer-executable instructions for a computer system 300. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of the invention.

A number of program modules may be stored in drives and RAM 305, including operating system 315, one or more application programs 316, other program modules 317, and program data 318. The application programs and program data can include functions and methods programmed to operate according to any one or more of a producer system, a server and a consumer device, such as shown and described herein.

A user may enter commands and information into computer system 300 through one or more input devices 320, such as a pointing device (e.g., a mouse, touch screen), keyboard, microphone, joystick, game pad, scanner, and the like. For instance, the user can employ input device 320 to select content and create a scheduled or live program at a producer system. Additionally or alternatively, a user can access a user interface via the input device to access a predefined resource identifier (e.g., a URL for a web session), such as the server where the web session and controls are made available. These and other input devices 320 are often connected to processing unit 301 through a corresponding port interface 322 that is coupled to the system bus, but may be connected by other interfaces, such as a parallel port, serial port, or universal serial bus (USB). One or more output devices 324 (e.g., display, a monitor, printer, projector, or other type of displaying device) can be connected to system bus 303 via interface 326, such as a video adapter.

As described herein, portions of the system may operate in a networked environment using logical connections between one or more remote computers, such as remote computer 328. Remote computer 328 may be a workstation, computer system, router, peer device, or other common network node, and typically includes many or all the elements described relative to computer system 300. The logical connections, schematically indicated at 330, can include a network, which can be a local area network (LAN) and a wide area network (WAN), such as the internet. The type of logical connection between portions of the system can vary, such as shown and described in the examples of FIGS. 1 and 2.

When used in a LAN networking environment, computer system 300 can be connected to the local network through a network interface or adapter 332. When used in a WAN networking environment, computer system 300 can include a modem, or can be connected to a communications server on the LAN. The modem, which may be internal or external, can be connected to system bus 303 via an appropriate port interface. In a networked environment, application programs 316 or program data 318 depicted relative to computer system 300, or portions thereof, may be stored in a remote memory storage device 340.

In view of the foregoing, those skilled in the art will understand that systems and methods implemented in accordance with an embodiment of the invention enables synchronization of web content to other media events without the need for specialized training in web authoring, additional equipment at the source of the media stream, and no additional configuration or expertise at the consumer-end. The systems and methods provides a web-delivered experience that can be implemented using existing technology (e.g., the .NET framework and standard ASPX and HTML pages), such that no additional hardware, software configuration, or expertise is required on either end of the transmission.

Additionally, since systems and methods can utilize standard and widely available web technology, it is equally suitable to an audience which is stationary or mobile. It is also platform-agnostic on the audience end and can be consumed by an audience regardless of their personal preference of computer system.

While one embodiment of the invention can be implemented to synchronize selected media content (e.g., via the internet) to traditional broadcasting, such as television or radio, it is within the anticipated scope of this invention to permit multiple synchronizations between many types of time based and static media and devices, such as broadcast television or radio, multimedia files, audio files, pictures, web pages, computer games, PDAs, mobile phones, musical instruments, and specialized databases.

Still further, as this is a method of synchronizing content of any sort to web content, it is well suited for the creation of a single-screen presentation template which can deliver both the primary content (such as a televisions broadcast or streaming video presentation) wrapped in interactive panels of dynamic content. This single-screen presentation can be interacted with either via the web or via a standard television connected to a computer or smart-box set-top device.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A method for synchronizing distribution of media with at least one scheduled media event, the method comprising:
 transferring selected content from a producer to a server at a time during the scheduled media event, wherein the selected content is transferred separately from a transfer of content corresponding to the scheduled media event;
 storing at the server the selected content transferred from the producer;
 providing the selected content from the server to at least one consumer via a network for presentation thereof at the at least one consumer substantially in synchronization with the scheduled media event;
 providing, from the server, each of the at least one consumer a web session that includes a plurality of target portions, each of the target portions presenting corresponding selected content substantially in synchronization with the scheduled media event, wherein a given one of the plurality of target portions operates independently of the other plurality of target portions; and
 providing a link history user interface that provides a log of information describing the selected content presented at a consumer during the web session, the link history user interface being actuatable to provide access to the selected content in response to a user input subsequent to the scheduled media event.

2. The method of claim 1, further comprising generating a target file at the producer according to a target associated with the selected content, the target file including the selected content and being transferred for the storing at the server.

3. The method of claim 2, wherein the storing at the server further comprises storing the target file at the server in a folder containing a plurality of predefined target files associated with the scheduled media event, each of the plurality of predefined target files defining a different target for the selected content stored therein.

4. The method of claim 3, wherein the selected content in each of the plurality of predefined target files is provided for presentation at the at least one consumer based on which of the plurality of predefined target files the selected content has been stored.

5. The method of claim 3, wherein the selected content comprises a resource locator that that is provided to the at least one consumer to identify a location at the server to enable retrieval and presentation of the selected content in the web session at the at least one consumer.

6. The method of claim 3, wherein the selected content comprises a mark-up language snippet that is provided to the at least one consumer for presentation thereof in the web session.

7. The method of claim 3, wherein the selected content comprises at least one of a text, audio, video, or audio-visual message that is provided to the at least one consumer for presentation thereof.

8. The method of claim 3, wherein each of the plurality of predefined target files comprises a respective XML file.

9. The method of claim 3, wherein each of the plurality of target portions is associated with a respective one of the plurality of predefined target files, the web session for each of the plurality of target portions employing a control programmed to perform polling of the server for obtaining updates in any of the plurality of predefined target files, the server providing each of the plurality of target portions with corresponding selected content for presentation in response to the polling.

10. The method of claim 1, wherein the producer is programmed to transfer the selected content to the server according to a predefined program for the scheduled media event, the predefined program comprising plural units of the selected content arranged in an order, each of the plural units having a offset time relative to a start time that determines when each of the plural units of the selected content is transferred to the server.

11. The method of claim 10, further comprising setting a loop control so that the transfer of each of the plural units of the selected content is repeated in the order and according to the offset time thereof after a last of the plural units of content in the predefined program has been transferred.

12. The method of claim 1, wherein the scheduled media event comprises a live media event, the transferring selected content from the producer further comprising manually controlling when the selected content is transferred from the producer to the server.

13. The method of claim 1, each of the target portions presenting the corresponding selected content in response to periodic polling of the server for updates in the corresponding selected content.

14. The method of claim 13, wherein the web session further comprises controls programmed to control the periodic polling and enable an interactive consumer experience with information presented in at least one of the plurality of target portions.

15. The method of claim 1, further comprising selecting at least some of the selected content that is transferred from the producer to the server in response to monitoring data that is provided with an occurrence of the scheduled media event.

16. A system for synchronizing distribution of media with at least one scheduled media event, the system comprising:
 a producer that transfers selected content to a server during the scheduled media event, wherein the selected content is transferred to the server separately from content corresponding to the scheduled media event;
 the server storing the selected content at a corresponding location that is accessible via a network, the server also being programmed to provide a bi-directional network session for each of a plurality of consumers that is in communication with the server via the network; and
 the bi-directional network session at each of the plurality of consumers being programmed to access the server during the scheduled media event and retrieve the selected content from the producer that is stored at the server, the bi-directional network session presenting information at each of the plurality of consumers in synchronization with the scheduled media event according to the selected content;
 wherein each bi-directional network session comprises:
  a plurality of target portions, each of the plurality of target portions independently presenting corresponding selected content in synchronization with the scheduled media event; and
  a link history user interface that provides a log of information describing the selected content presented at a consumer device during the bi-directional network session, the link history user interface being actuatable to provide access to the selected content in response to a user input subsequent to the scheduled media event.

17. The system of claim 16, wherein the producer further comprises a content selector that is programmed to select which content to transfer to the server and when to transfer such content during the scheduled media event.

18. The system of claim 16, wherein the scheduled media event comprises one of a live media event or a pre-recorded media event.

19. The system of claim 16, wherein the producer further comprises a target file generator programmed to generate a target file for the selected content as one of plurality of predefined target files according to a target field in the selected content, the selected content being transferred to the server as part of the target file that is generated.

20. The system of claim 19, wherein each of the plurality of target portions retrieving the selected content from a respective one of the plurality of predefined target files for presenting the corresponding selected content in synchronization with the scheduled media event according to the retrieval of each one of the plurality of predefined target files by the respective network session.

21. A computer system programmed to transfer target files to a server in synchronization with an occurrence of a scheduled media event, wherein the target files are transferred separately from content corresponding to the scheduled media event, each of the target files comprising at least one of preselected content or a preselected location identifier for content, the server storing the target files and making the stored the target files available for retrieval via web sessions running at each of a respective plurality of consumer devices, information presented via the web sessions at each of the respective plurality of consumer devices being provided substantially in synchronization with the occurrence of the scheduled media event, wherein each web session comprises a plurality of target portions, each of the plurality of target portions retrieving preselected content based on the respective target files for independently presenting corresponding preselected content in synchronization with the scheduled media event, wherein the server is further configured to store a link history available for retrieval from a user interface running at each of the respective plurality of consumer devices, the link history providing a log of information describing the preselected content presented during the web sessions, the link history user interface at each of the respective plurality of consumer devices being actuatable to provide access to the preselected content in response to a user input subsequent to the scheduled media event.

22. The system of claim 16, wherein the network session includes at least one user control for each of the plurality of target portions that provides independent control of each of the plurality of target portions.

23. The method of claim 1, wherein the web session and the scheduled media event are provided at separate consumer devices.

24. The method of claim 1, further comprising adjusting the web session in response to a control activated at a given one of the plurality of target portions, wherein the adjusting comprises:
 suspending an updating at the given one of the plurality of target portions in response to a given user input;
 re-synchronizing the given one of the plurality of target portions to the scheduled media event in response to another user input.

* * * * *